Patented Feb. 9, 1943

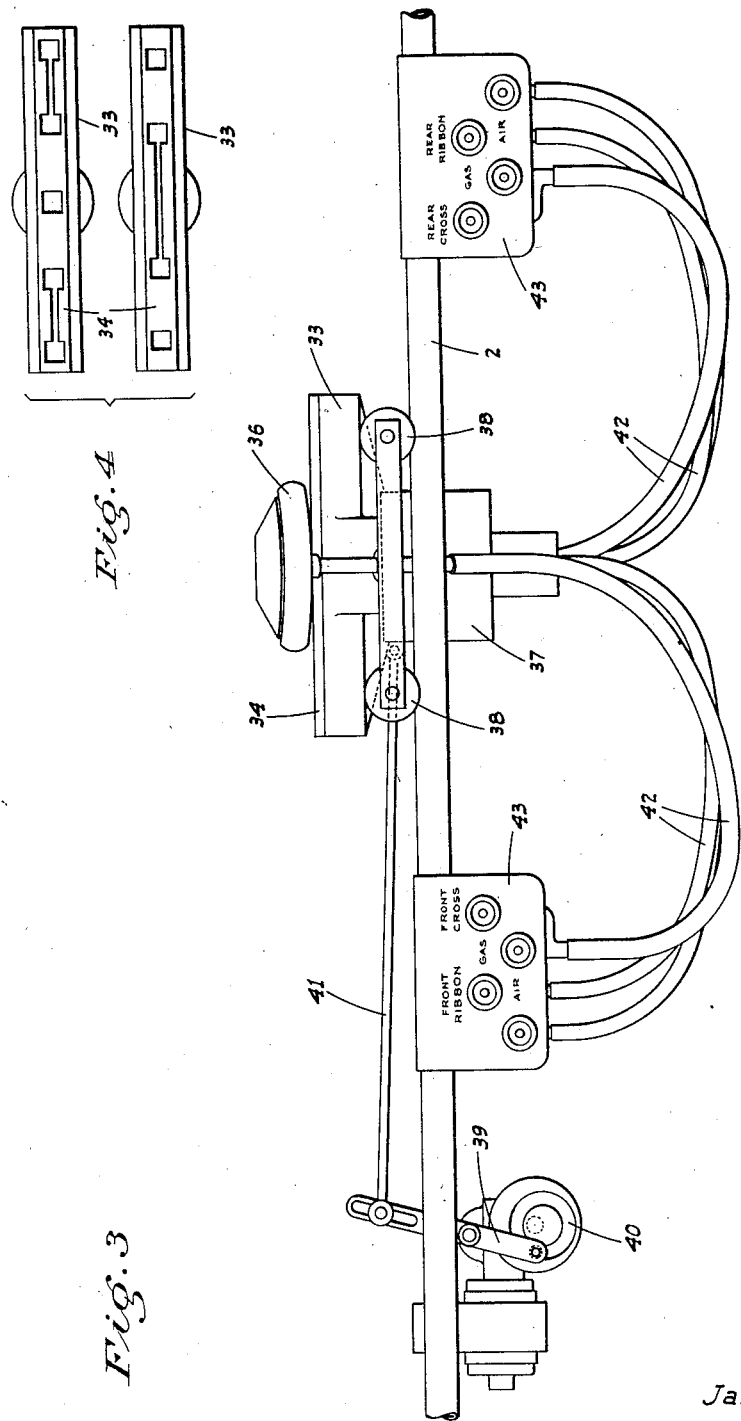

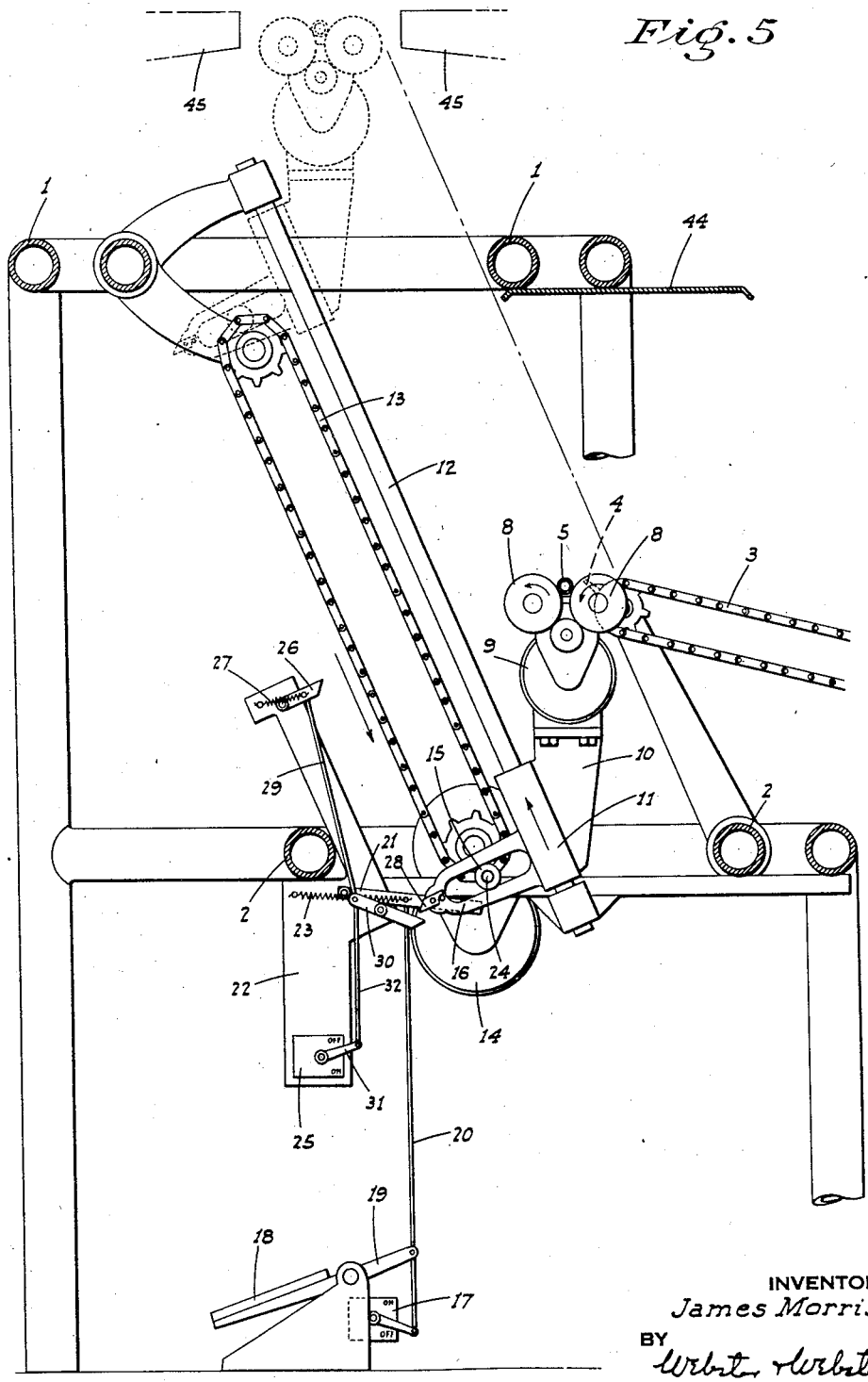

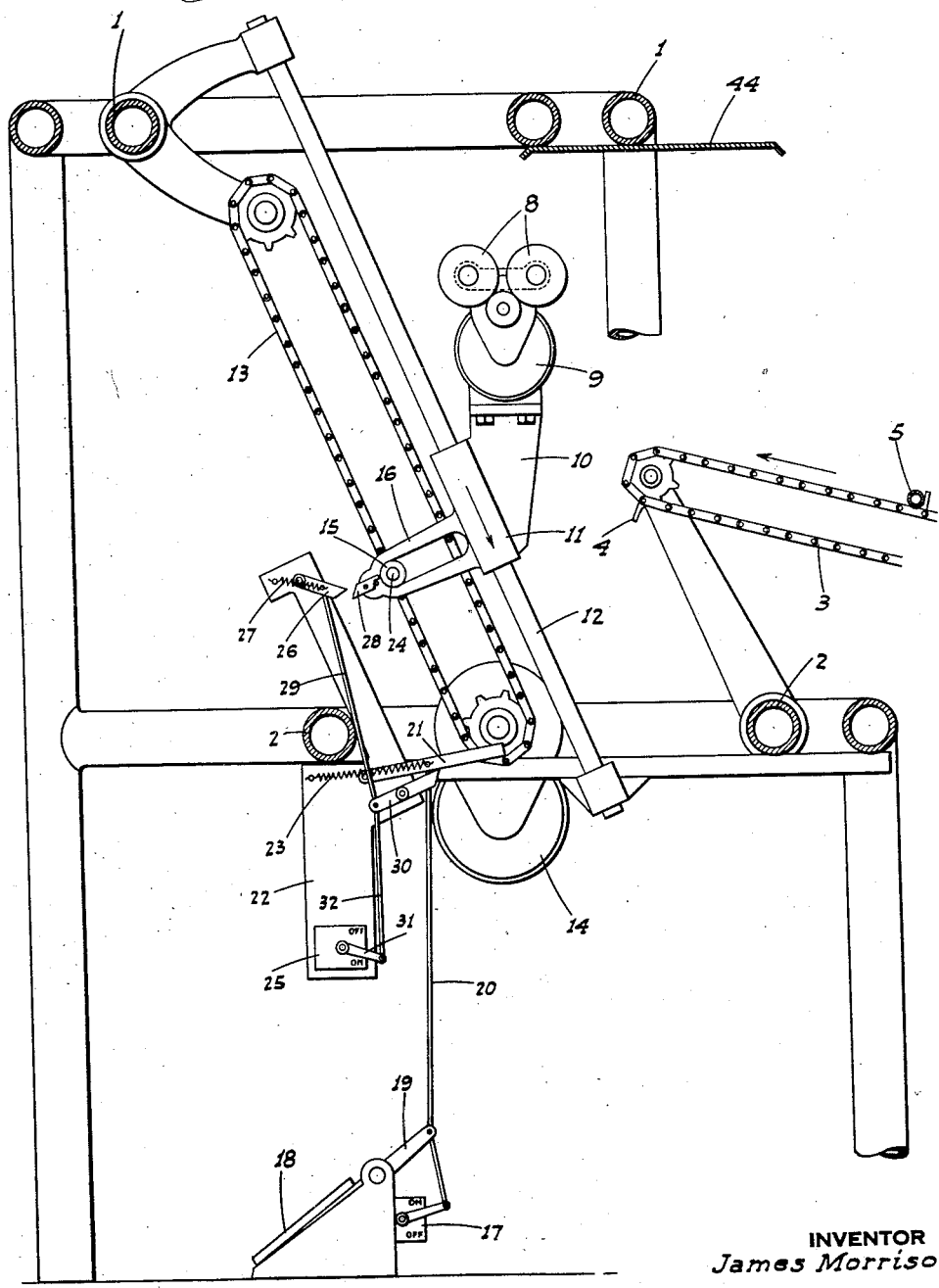

2,310,537

UNITED STATES PATENT OFFICE 2,310,537

APPARATUS FOR HANDLING GLASS TUBING

James Morrison, San Francisco, Calif.

Application February 2, 1940, Serial No. 316,962

11 Claims. (Cl. 49—58)

This invention relates to apparatus for handling, heating and working glass tubing such as is widely used in "neon" and like signs, my principal object being to provide an apparatus, under full control of the glass working operator, by means of which the tubing will be fed to him for bending in single file and controlled order, and will while being so fed, be preheated along whatever portions of their length may be necessary for certain types of bends.

The apparatus is particularly of value when a large number of tubes are to be bent to the same size and shape, and its use then speeds up production considerably and avoids inaccuracies and unevenness in tube heating and form, and enables each tube to be drawn from the supply, heated and then bent, all in one continuous operation and without the need of the operator moving from one certain position.

These objects I accomplish by means of such structure and relative arrangement of parts as will fully appear by a perusal of the following specification and claims.

In the drawings similar characters of reference indicate corresponding parts in the several views:

Figure 3 is a fragmentary side view featuring the reciprocating preheating burner unit.

Figure 4 is a plan view illustrating ribbon burner heads having different flame distribution.

Figure 5 is a fragmentary enlarged transverse section on line 5—5 of Fig. 1 emphasizing the tubing elevator, and showing the same as halted at its lowest position and with a length of tubing delivered onto the supporting rollers of the elevator, and with the elevator shown dotted in its topmost position.

Figure 6 is a similar view showing the elevator as descending and the conveyor as advancing with another length of tubing.

Figure 1:
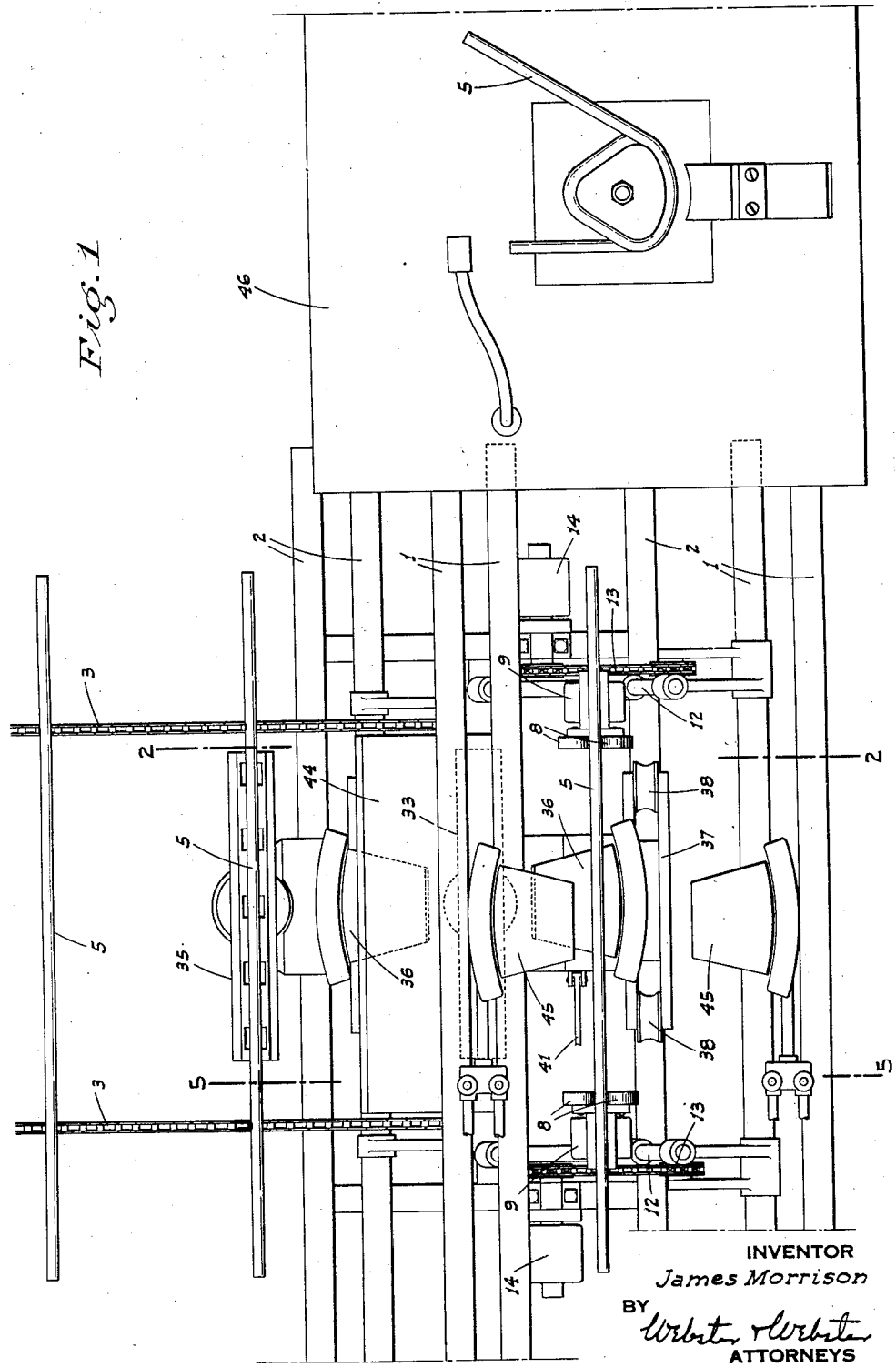
Figure 1 is a fragmentary top plan view of the apparatus with a tube as being elevated.

Referring now more particularly to the characters of reference on the drawings, the supporting framework of the apparatus includes upper horizontal parallel rails 1 preferably arranged as laterally spaced front and back pairs, and lower parallel rails 2. A tube conveyor comprising spaced endless chains 3 or the like and having evenly spaced cleats 4 to engage a length of tubing 5 resting crosswise on the chains, extends from a tubing supply hopper 6 to a termination some distance above the adjacent back ones of the lower frame rails 2. The elevator is driven by an electric motor 7 so that the upper run of the chains travels away from the hopper.

Mounted on the framework to cooperate with the conveyor is an elevator arranged to receive individual lengths of tubing from the conveyor and lift the same to a level well above the upper rails 1 and substantially centrally between the spaced pairs of such rails.

Figure 2:
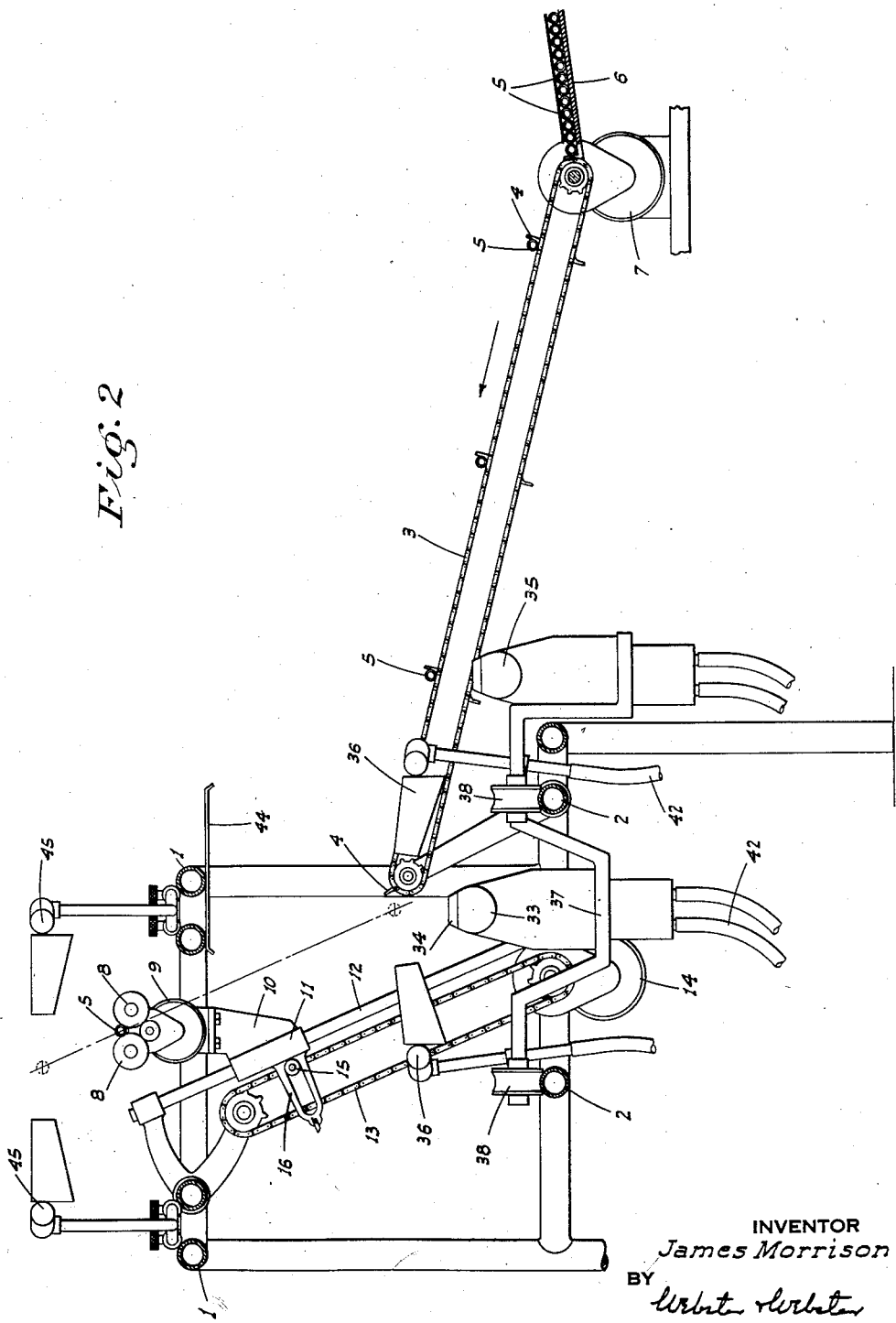
Figure 2 is a fragmentary transverse section on line 2—2 of Fig. 1, featuring particularly the arrangement of the preheating and working burners relative to the tubing as being conveyed and from the supply and then elevated.

This elevator comprises a pair of separate units each having alined pairs of separate rollers 8 arranged to form a cradle to support a tubing as shown in Figs. 2 and 5, the rollers of the unit being spaced to project close to but clear of the conveyor chains 3. These pairs of rollers are individually driven in the same direction, as indicated in Fig. 5, by electric motors 9, and each pair of rollers and the corresponding motor are mounted as a unit on a bracket 10. The bracket is formed with a sleeve 11 slidable on a bar 12 supported from the framework at an angle and of a length such that with upward movement of the bracket, the tubing supported by the rollers will move forwardly somewhat from its lowermost position adjacent the conveyor to its topmost position centrally between and well above the upper rails 1, as indicated in Fig. 5. In this manner the elevated tubing is in a position convenient to the front side of the apparatus, at which the operator has his stand, and which is that side opposite the conveyor. Various mechanisms may be employed to reciprocate the elevator through the desired stroke. In the present instance, I have shown such mechanism as comprising, for each elevator unit, an endless chain 13 parallel to the bar 12 and driven at a suitable speed by an electric motor 14, the motors of the two units having of course the same speed so that the chains and units will travel at the same rate. Reciprocating motion is transferred to the elevator unit from the endless chain by a roller 15 projecting laterally therefrom and riding in a slotted crosshead 16 rigid with the sleeve 11 and projecting across the runs of the chain.

In the operation of the apparatus it is desirable that the elevator shall make one full reciprocation only from its lowermost position and that it shall be stated at any time at the will of the operator. In connection with this movement of the elevator, it is intended that the conveyor shall advance only a distance between adjacent cleats, and only with the downward travel of the elevator, in such timed relation to such travel as to deliver a length of tubing onto the elevator as the latter reaches the bottom of its stroke, the conveyor then halting also until again started by a subsequent downward movement of the elevator.

These timed movements are of course effected by suitable control of the conveyor and elevator motors 7 and 14, and such control is effected with the use of a single manually closed switch. In the present instance, I have shown a single-action snap switch 17, connected for operation to a depressible foot pad or pedal 18 by an arm 19 in such a manner that the switch is only closed when the pedal is depressed.

The arm 19, which is rigid with the pedal, is connected by a link or rod 20 with a pivoted lever 21 mounted on a panel 22 near the lower end of chain 13 and connected to a snap action spring 23. The free end of this lever, when held up by spring 23, projects into the path of an element on the chain (such as spindle 24 of roller 15) so as to be depressed past dead center postion by said spindle as the latter reaches its lowermost position and moves clear of the lever. The lever, switch and pedal are so related that when the pedal is depressed and the switch is closed, the lever is lifted into the path of the spindle, and when the latter engages and depresses the lever, the spring 23 will then act to swing the lever further down and open the switch. Practically instantaneous stoppping of the motor and elevator is thus effected, without interfering with manual reclosing of the switch when desired.

It will of course be understood that the one switch may control both motors 14, and since the necessary circuit may obviously be of the very simplest nature, it is deemed unnecessary to illustrate the same. It may also be here noted that the conventional form of flexible housing enclosed rod, such as is used in various devices, may be used instead of the bar rod 20 if desired, so that the pedal need not be located directly below lever 21.

A single action snap switch 25 for the circuit of motor 7 is also mounted on panel 22, and the closing and subsequent opening of this switch is effected by downward movement of the elevator through a predetermined portion of its travel by the following means: Mounted on panel 22 is a pivoted arm 26 projecting toward the chain 13 and located intermediate its ends. This arm is connected to a snap action spring 27 and when held relatively raised by said spring, projects into the path of a dog 28 mounted on the crosshead 16 for yielding movement in an upward direction only. The arm 26 is connected by a link 29 with another arm 30 pivoted intermediate its ends on the panel in position to project into the path of movement of dog 28 when the latter reaches its lowermost position. Arm 30 in turn is connected to switch arm 31 by a link 32. Arms 26 and 30 are so arranged relative to each other and to the switch arm that when the arm 26 is in the path of the dog, the arm 30 is clear of such path and vice versa, and when the arm 26 is in said path the switch 25 is open and vice versa. It will thus be seen that as the dog moves down with the downward movement of the elevator, it depresses arm 26, closing the switch and at the same time moving arm 30 into the path of the dog starting the conveyor motor 7. Then when the elevator reaches the bottom of its stroke, the dog engages arm 30, causing the arm 26 to be returned to its original position and again opening the switch, thus halting the conveyor.

The speed of motor 7 is such that between the closing and opening of switch 26, the conveyor will move a distance equal to the spacing between lugs 4, while the lugs are located on the conveyor chain so that when the conveyor stops, one lug is in position to have just delivered a tubing onto the elevator rollers 8, as indicated in Fig. 5.

When the operator depresses the pedal, the elevator starts and lifts the tubing to the top, and the operator then removes said tubing from the elevator so that the latter as it descends is empty. As previously described, the descent of the elevator starts the conveyor, which advances another length of tubing and delivers the same onto the elevator when the latter reaches the bottom of its travel and stops.

The tubing is well preheated by the time it reaches the operator by the following means:

Disposed directly below the position occupied by a tubing on the elevator between the rollers thereof when the elevator is at the bottom of its stroke is an upwardly facing ribbon burner 33 having a removable or replaceable head 34 so that different distributions of flame along the head may be obtained, as indicated in Fig. 4, and as different tube bends to be made may require. Another similar ribbon burner 35 is disposed between the conveyor chains directly below the position occupied by the length of tubing supported on the conveyor adjacent that supported by the elevator. Opposed and facing cross burners 36 are disposed on opposite sides of the tubing supported by the elevator and between the units thereof. All these are the preheating burners, and they are mounted as a unit on a carriage 37 supported for limited movement along the lower rails 2 by rollers 38 engaging the same. The carriage is reciprocated through a short but adjustable stroke by means of an upstanding lever 39 oscillated from a motor driven cam 40, a link 41 extending from the carriage to an adjustable connection with the lever. (See Fig. 3.)

Since the burners do not occupy a fixed position, the necessary gas and air conduits 42 are flexible and extend from the burners to the control valve panels 43 which are fixed on the front of the framework in positions convenient to the operator.

It will therefore be seen that each length of tubing is initially preheated while resting on the conveyor, and again and more thoroughly while on the elevator before being elevated, and only along those portions thereof which need to be heated for subsequent bending.

In order to deflect the upwardly directed gas fumes and heat rising from the ribbon burner 33, a deflector plate 44 is mounted on and under the upper back rails 1.

Working cross burners 45 are mounted on opposite sides of the position of the central portion of the tubing when at the top of the elevator stroke, and other working burners of the ribbon or other type may also be mounted in a convenient position adjacent or in place of said cross burners. These working burners are all supported from the upper rails and removable.

Rotation of the tubes while being preheated, and reciprocation of the preheating burners, are important factors, since they insure even heating of the tubes all about the same, without manual handling. The use of replaceable heads or slides on the ribbon burners is also of vital importance, since by this means the tubes are definitely heated along the zones where the bends are to be made, and depending on the shape to be formed.

In connection with the tube preheating and elevating means, I have provided a work table on which to bend and work the tubes. This table is a rigid rectangular metal-faced member 46, extending over the top rails 1 and disposed to the right of the elevator with respect to the front of the apparatus and the position occupied by the operator. This table is pivoted on the framework just behind the back rail 1 and its tilting controlled, by mechanism which forms the subject matter of a separate invention.

It may here be noted that while I specify glass tubes as being the members to be worked on, it is possible that it may be desirable to bend glass rods, and the term "tubes" is intended to cover both forms.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an apparatus for use in connection with the bending of glass tubes, a tube supply arranged to support the tubes horizontally, an elevator spaced from the supply and arranged to engage and elevate a single tube in a horizontal position, a traveling conveyor leading from the supply to the elevator and arranged to support a plurality of tubes in spaced order, controlled instrumentalities to intermittently drive the conveyor and elevator arranged so that as the latter reaches its lowermost position, the conveyor will deposit a tube thereon and means positioned to preheat said deposited tube and also the adjacent tube on the conveyor as long as said conveyor and elevator are stationary.

2. In an apparatus for use in connection with the bending of glass tubes, a tube supply arranged to support the tubes horizontally, an elevator spaced from the supply and arranged to engage and elevate a single tube in a horizontal position, controlled means to drive the elevator, means to deposit a tube onto the elevator when the latter is at its lowermost position, the elevator including horizontally spaced elements to support a tube at spaced points in its length, a burner mounted below the supported tube in position to apply heat to a portion of the same exposed between the spaced elements when the elevator is in said lowermost position, and means to reciprocate said burner lengthwise through a certain stroke along a path parallel to the supported tube.

3. In a tube handling apparatus, a tube supply arranged to support the tubes horizontally, an elevator spaced from the supply and arranged to engage and elevate a single tube in a horizontal position, a conveyor leading from the supply to the elevator and arranged to support a plurality of tubes in spaced order, said conveyor being positioned and arranged to deposit a tube onto the drive means when the elevator is in its lowermost position, drive means for the elevator to lift the same a certain distance and then again lower it, manual means to initially place said drive means in operation when said elevator is in said lowermost position whereby the elevator will be lifted and again lowered and automatically functioning means to halt the drive means when the elevator again reaches said lowermost position.

4. In a tube handling apparatus, a tube supply arranged to support the tubes horizontally, an elevator spaced from the supply and arranged to engage and elevate a single tube in a horizontal position, a conveyor leading from the supply to the elevator and arranged to support a plurality of tubes in spaced order, said conveyor being positioned and arranged to deposit a tube onto the elevator when the latter is in its lowermost position, drive means for the elevator to lift the same a certain distance and then again lower it, control instrumentalities for said drive means arranged to cause the elevator to move up from its lowermost position and then down and to then stop when again at said position, normally idle drive means for the conveyor and control means for said conveyor drive means actuated by downward movement of the elevator and arranged so that the conveyor will travel only a distance equal to the distance between adjacent tubes supported thereon and will be halted when the elevator halts.

5. In an apparatus for use in connection with the bending of glass tubes, an elevator to engage and support a single tube horizontally and to elevate said tube from a predetermined low position, a plurality of burners disposed to apply heat to a portion of such tube when the latter is in said low position, means mounting the burners as a unit for movement along a path parallel to the tube and means to reciprocate said mounting means along said path.

6. In an apparatus for use in connection with the bending of glass tubes, an elevator to engage and support a single tube horizontally and to elevate said tube from a predetermined low position, a burner disposed to apply heat to a portion of such tube when the latter is in its low position, means mounting the burner for movement along a path parallel to the tube and means to reciprocate said mounting means along said path through a stroke of predetermined length.

7. In an apparatus for use in connection with the bending of glass tubes, an elevator to engage and support a single tube and elevate the same a predetermined distance from a predetermined low portion, drive means for the elevator effective when in operation to lift the same from said low position and then again lower it to said position, manual means to initially place said drive means in operation when the elevator is in said low position and automatically functioning means to halt the drive means when the elevator again reaches said low position.

8. In a tube handling apparatus, an elevator to engage and support a single tube and elevate the same a predetermined distance from a predetermined low portion, drive means for the elevator comprising an electric motor, a switch in the circuit of the motor, manual means to close the switch and means functioning only upon arrival of the elevator to said low position to open the switch whereby when the switch is closed the motor will function to lift and again lower the elevator for its full travel.

9. In a tube handling apparatus, an elevator to engage and support a single tube and elevate the same a predetermined distance from a predetermined low portion, drive means for the elevator comprising an electric motor, a switch in the circuit of the motor having a movable actuating member, a snap-action lever mounted adjacent the lower end of the elevator and projecting toward the same, an element on the elevator positioned to engage and trip the lever in one direction and out of the path of the element when the elevator reaches said low position, a link between the lever and switch member to open the switch with tripping of the lever in said one direction and manually operated means connected to said link to move the same so as to close the switch and trip the lever in the opposite direction so as to place the same in the path of movement of the elevator element for subsequent tripping with a following downward movement of the elevator element.

10. In a tube handling apparatus, a hopper to hold the members horizontally, an elevator spaced from the hopper to engage and raise a single member from a predetermined low position, a conveyor leading from the hopper to the elevator and arranged to support a plurality of members in spaced relation and to deposit a member onto the elevator when the latter is in said low position, drive means for the elevator to reciprocate the same through a path of predetermined length, intermittently operable drive means for the conveyor, and means functioning upon downward movement of the elevator to place said conveyor drive means in operation so that the latter will advance a member in time to deposit the same on the elevator when the latter reaches said low position, and to then halt the conveyor drive means.

11. A structure as in claim 10 in which the conveyor drive means comprises an electric motor; said last named means comprising a normally open switch in the circuit of the motor including an actuating arm, a pair of levers spaced lengthwise of and projecting toward the elevator, a link connecting the levers and switch arm and arranged so that when the upper lever is swung down the switch will be closed and the lower lever swung up, and when the lower lever is swung down the switch will be opened and the upper lever swung up, and a trip element mounted on the elevator in position to first engage the upper lever and swing the same down and then to engage and swing the lower lever down when the elevator reaches its low position whereby to then reopen the switch.

JAMES MORRISON.